United States Patent [19]

Wessels

[11] Patent Number: 4,802,592
[45] Date of Patent: Feb. 7, 1989

[54] FLOATING LIQUID SKIMMERS HAVING A FLOATING WEIR

[75] Inventor: Allistair P. Wessels, Bryanston, South Africa

[73] Assignee: Fahet NV, Curacao, Netherlands Antilles

[21] Appl. No.: 156,365

[22] Filed: Feb. 16, 1988

[30] Foreign Application Priority Data

Feb. 17, 1987 [ZA] South Africa ............... 87/1137

[51] Int. Cl.4 ............................................. E04H 3/20
[52] U.S. Cl. .................................. 210/169; 210/242.1; 4/490; 137/578; 137/423; 137/404
[58] Field of Search ................. 210/169, 416.2, 123, 210/242.1; 134/167 R; 4/490; 15/1.7; 137/578, 423, 404

[56] References Cited

U.S. PATENT DOCUMENTS

| 614,059 | 8/1898 | Noble | 137/578 |
| 2,597,728 | 5/1952 | Hink | 210/242.1 |
| 2,663,425 | 8/1949 | Haselwood | 210/242.1 |
| 3,860,518 | 1/1975 | Henricksen | 210/242.1 |
| 4,105,557 | 8/1978 | Weatherbolt | 210/242.1 |
| 4,136,712 | 1/1979 | Nogami et al. | 137/558 |
| 4,746,424 | 5/1988 | Drew | 210/242.1 |

Primary Examiner—Richard V. Fisher
Assistant Examiner—Coreen Y. Lee
Attorney, Agent, or Firm—Ladas & Parry

[57] ABSTRACT

The floating skimmer has a body fitted with a floating weir and with a suction outlet in its base for connection to a suction hose. A float is provided to keep the body afloat. The float is hinged to a wall of the body. A scuttle valve is provided in a wall of the body and is connected to the float. If the body should rise in the water, the float drops and opens the scuttle valve to admit water to the body and scuttle it so that it sinks to its former level.

6 Claims, 1 Drawing Sheet

FLOATING LIQUID SKIMMERS HAVING A FLOATING WEIR

BACKGROUND OF THE INVENTION

This invention relates to floating skimmers of the kind which can be used to skim the surfaces of swimming pools.

Floating skimmers connected to suction hoses are known. In one such proposal (see U.S. Pat. No. 3,928,202) a suction hose connected to an automatic pool cleaning service is also connected to a floating skimmer. The water flowing in the hose drives a turbine which drives a pump and the pump draws water over a floating weir on the skimming device. The skimming device is kept buoyant by means of a suitable float. In this case the skimming device passes water through a filter chamber and discharges it back into the pool.

If a floating skimmer is connected directly to the suction line, so that water coming over the floating weir passes to the filtration plant, the level at which the device floats will change as the suction force and other conditions change, with the results that effective skimming is not possible at all times.

SUMMARY OF THE INVENTION

According to the invention a floating skimmer comprises a body, a floating weir at an edge of the body over which liquid can pass into the body, a suction outlet in the base of the body for connection to a suction hose, at least one float for keeping the body buoyant and which is hinged to the body, a scuttle valve in a wall of the body, and motion transmitting means between the float and the scuttle valve so that as the float pivots downwardly when the body rises in liquid, the scuttle valve is opened to allow liquid to enter the body and cause it to float at its original level.

In the preferred form of the invention the body is in the form of an open-topped, rectangular box which has floats hinged to it on opposite sides thereof and which has a scuttle valve in each of those sides connected to the relevant float.

Conveniently the scuttle valve comprises an opening in the wall of the body and a mushroom valve member having a valve stem which projects outwardly from the body and which is in the form of a bent rod connected to the float.

It is also preferred that there be floating weirs on each of those two sides which are not attached to the floats.

The skimmer may comprise a connector for connecting the suction outlet of the body with a suction hose going to an automatic swimming pool cleaner.

In one version, the suction outlet of the body is controlled by a valve which permits a predetermined leak of liquid to take place out of the body into the suction hose.

In another version, the suction outlet of a body is controlled by a changeover valve operable selectively to connect the interior of the body to the suction hose or to connect the suction hose to an automatic pool cleaner.

DESCRIPTION OF THE DRAWINGS

The invention will now be described in more detail by way of example only, with reference to the accompanying drawings in which.

DESCRIPTION OF AN EMBODIMENT

Figure 1:
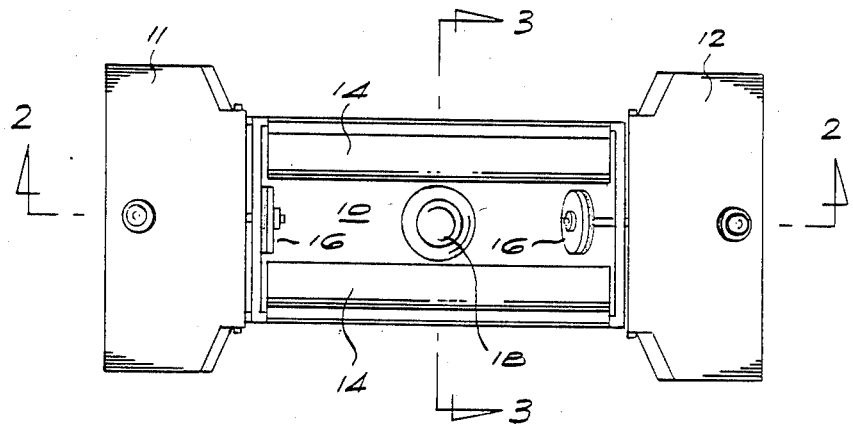
FIG. 1 shows a top view of a floating skimmer.

The illustrated embodiment comprises a rectangular box 10 which is rendered buoyant by means of a pair of floats 11 and 12 pivoted to opposed sides 13 of the box. The other two sides are of reduced height and carry floating weirs 14. Each side 13 is formed with a scuttle hole 15 which can be closed by a mushroom valve 16. The stem of each mushroom valve 16 is in the form of a bent rod 17 secured to a float 11 or 12.

In the floor of the box 10 there is secured a valve 18 of the kind described in S.A. Pat. No. 85/2403 equivalent to U.S. Pat. No. 4,683,599. The valve 18 is in the leg of a T-piece 19 which can be connected in a suction line between a filter plant and an automatic pool cleaner. As an alternative the valve 18 and the T-piece 19 can be relaced with a changeover valve which may be actuated manually so that the suction hose is connected either to the cleaner or to the floating skimmer. Such a valve could be actuated automatically at the start of a filter cycle so that during one cycle skimming takes place and during the next cycle suction cleaning.

Figure 2:
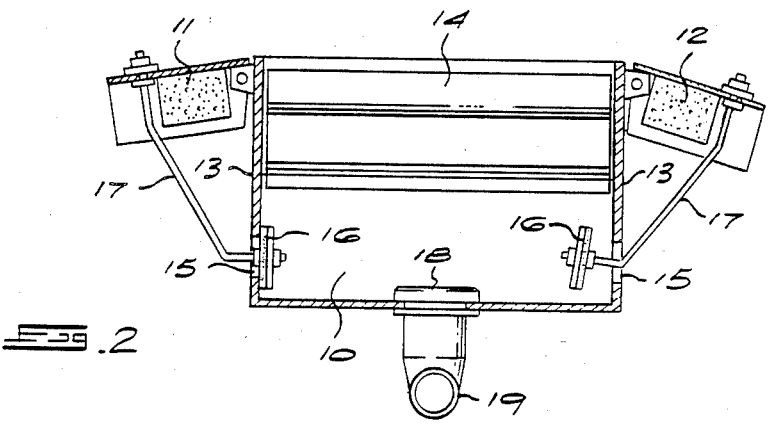
FIG. 2 shows a cross-section on the line 2—2 in FIG. 1.
Figure 3:
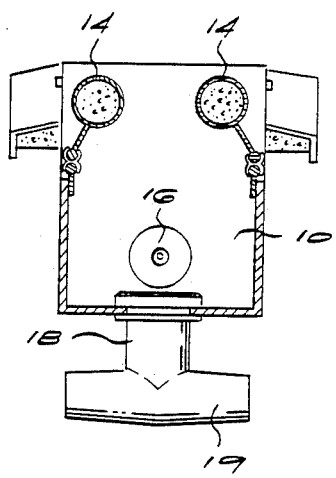
FIG. 3 shows a cross section on the line 3—3 in FIG. 1.

In operation the valve 18 is set to allow a predetermined leak from the box 10 into the suction line while the device floats in water. The floats 11 and 12 will normally be in the position illustrated for the float 11 in FIG. 2, i.e. the valves 16 are closed. Should conditions change and the device tend to rise in the water, the floats will drop and the valves 16 will open as shown in connection with the float 12 in FIG. 2. This admits water into the box 10 and thus tends to scuttle the box 10 until the floats resume their normal position and the valves 16 close again.

I claim:

1. A floating skimmer which comprises a body, a floating weir at an edge of the body over which liquid can pass into the body, a suction outlet in the base of the body for connection to a suction hose, at least one float for keeping the body buoyant and which is hinged to the body, a scuttle valve in a wall of the body, and motion transmitting means between the float and the scuttle valve so that as the float pivots downwardly when the body rises in liquid, the scuttle valve is opened to allow liquid to enter the body and cause it to float at its original level.

2. A floating skimmer according to claim 1 in which the scuttle valve comprises an opening in the wall of the body and a mushroom valve member having a valve stem which projects outwardly from the body and which is in the form of a bent rod connected to the float.

3. A floating skimmer according to claim 2 in which the body is in the form of an open-topped, rectangular box which has floats hinged to it on opposite sides thereof and which has a scuttle valve in each of those sides connected to the relevant float.

4. A floating skimmer according to claim 3 in which there are floating weirs on each of those sides of the box which do not have floats hinged to them.

5. A floating skimmer according to claim 4 in which the suction outlet of the body is controlled by a valve which permits a predetermined leak of liquid to take place to of the body into the suction hose.

6. A floating skimmer according to claim 4 in which the suction outlet of the body is controlled by a changeover valve operable selectively to connect the interior of the body to the suction hose or to connect the suction hose to an automatic pool cleaner.

* * * * *